(12) United States Patent
Shimazaki

(10) Patent No.: US 7,239,421 B2
(45) Date of Patent: Jul. 3, 2007

(54) IMAGE DATA PRODUCING APPARATUS AND IMAGE DATA PRODUCING PROGRAM STORAGE MEDIUM

(75) Inventor: Osamu Shimazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 621 days.

(21) Appl. No.: 09/793,121

(22) Filed: Feb. 27, 2001

(65) Prior Publication Data
US 2001/0017706 A1   Aug. 30, 2001

(30) Foreign Application Priority Data
Feb. 29, 2000  (JP)  ............................. 2000-053755

(51) Int. Cl.
*H04N 1/405* (2006.01)
(52) U.S. Cl. ........................ 358/1.9; 358/3.06; 358/534
(58) Field of Classification Search ............... 358/3.06, 358/3.09, 3.1, 3.11, 3.12, 3.13, 3.14, 3.15, 358/3.16, 3.17, 3.18, 3.19, 3.2, 1.9, 534, 358/535, 536
See application file for complete search history.

(56) References Cited

U.S. PATENT DOCUMENTS 5,680,222 A * 10/1997 Ashworth ................ 358/3.16
6,026,216 A * 2/2000 Ohtsuka et al. ............ 358/1.9
6,072,592 A * 6/2000 Ashworth ................. 358/1.9

\* cited by examiner

*Primary Examiner*—Thomas D. Lee
(74) *Attorney, Agent, or Firm*—Sughrue Mion, PLLC

(57) ABSTRACT

In an image data producing apparatus for producing proofing halftone dots image data representative of a proof image in which an image obtained by a printing system is simulated, the image data producing apparatus has: a halftone dots pattern data storage section for storing a plurality of sorts of halftone dots pattern data representative of a plurality of sorts of halftone dots patterns; an image data obtaining section for obtaining the multi-tone level image data; a halftone dots pattern selecting section for selecting a single halftone dots pattern according to an operation from among the plurality of sorts of halftone dots patterns represented by the plurality of sorts of halftone dots pattern data stored in said halftone dots pattern data storage section; a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section; and an image data output section for outputting the proofing halftone dots image data produced by said halftone dots image data producing section.

8 Claims, 13 Drawing Sheets

HALFTONE DOTS PATTERN REGISTRATION DATA LIST

| HALFTONE DOTS PATTERN NAMES | OUTPUT MACHINE NAMES | OUTPUT RESOLUTIONS | HALFTONE DOTS SHAPES | HALFTONE LINE NUMBERS (SUBSTANTIAL LINE NUMBERS) | HALFTONE DOTS ANGLES (SUBSTANTIAL ANGLES) |
|---|---|---|---|---|---|
| T9000 STANDARD DOTS | LUXEL T9000CTP | 2438.4DPI | SQUARE | 175LPI (C:177.3LPI) (M:178.2LPI) (Y:174.8LPI) (K:177.3LPI) | C15° (15.03°) M45° (45°) Y0° (0°) K75° (74.97°) |
| P5600 STANDARD DOTS | LUXEL P5600CTP | 2400DPI | ELLIPTICAL | 300LPI (C:304.6LPI) (M:308.7LPI) (Y:306.2LPI) (K:304.6LPI) | C75° (7.3°) M37.5° (37.7°) Y-7.5° (-7.9°) K67.5° (68.2°) |

- a1 — DATA READ
- a2 — DELETE
- a3 — CANCEL
- a4 — UP AND DOWN REVERSAL
- a5 — RIGHT AND LEFT
- a6 — 90° ROTATION
- a7 — 180° ROTATION
- a8 — 270° ROTATION

Fig. 6

IMAGE DATA PRODUCING APPARATUS AND IMAGE DATA PRODUCING PROGRAM STORAGE MEDIUM

BACKGROUND OF THE INVENTION

1. Field of the Invention

The present invention relates to an image data producing apparatus for producing image data representative of a proof image in which an image obtained by a printing system is simulated, and an image data producing program storage medium storing an image data producing program which causes a computer system to operate as such an image data producing apparatus when the image data producing program is executed in the computer system.

2. Description of the Related Art

Hitherto, in the event that a printing for an image is performed in a printing system for printing a color image, an operator uses prior to the printing a proofer readily reproducing the image to confirm the finish of the image to be printed in the printing system referring to a proof image produced by the proofer. A function of the proofer to simulate the image obtained in the printing system is implemented by a proofing image data producing apparatus for producing image data representative of such a proof image.

FIG. 13 is a schematic construction view of a conventional proofer and a printing system.

FIG. 13 shows a printing system 2000 and a conventional proofer 1000'. The printing system 2000 comprises a printing halftone dots image data producing apparatus 400, a CTP (Computer To Plate) 500 and a printing machine 501. The printing halftone dots image data producing apparatus 400 receives, for example, multi-tone level image data for C, M, Y, K-plates, and produces halftone dots image data through a halftone dots process for the received multi-tone level image data. The CTP 500 receives the halftone dots image data thus produced and produces a printing plate in accordance with the received halftone dots image data. The printing machine 501 continuously prints halftone dots images on a sheet using the produced printing plate.

The conventional proofer 1000' comprises a proofing halftone dots image data producing apparatus 100' and a printer 200. The proofing halftone dots image data producing apparatus 100' receives multi-tone level image data, which are the same as the multi-tone level image data fed to the printing system 2000, and applies a multi-tone level conversion and a color conversion to the received multi-tone level image data and further applies a halftone dots process to the multi-tone level image data subjected to the conversion, so that proofing halftone dots image data is produced. The printer 200 receives the proofing halftone dots image data thus produced and prints out halftone dots image according to the received halftone dots image data.

The conventional proofer 1000' performs the color adjustment and the multi-tone level adjustment for the image data in the manner as mentioned above so that a halftone dots image to be printed by the printing system 2000 may be approximately reproduced on a halftone dots image printed out by the printer 200.

However, in general, the halftone dots image printed out by the proofer 1000' is different, as compared with the halftone dots image printed by the printing system 2000, in a halftone dots pattern which is defined by elements such as angle and interval in a halftone dots arrangement and shape and size of halftone dots. Such a difference in the halftone dots pattern of an image brings about a difference in Rosette pattern and moiré pattern and thereby bringing about impressions of the image in its entirety. Such a halftone dots pattern is determined in accordance with an image data producing apparatus for producing image data representative of a proof image. Thus, there is desired an image data producing apparatus for producing image data representative of a proof image which reproduces an image to be printed in a printing system and a halftone dots pattern as well.

SUMMARY OF THE INVENTION

In view of the foregoing, it is an object of the present invention to provide an image data producing apparatus for producing image data representative of a proof image which reproduces a halftone dots pattern of an image to be printed in a printing system, and an image data producing program storage medium storing an image data producing program which causes a computer system to operate as such an image data producing apparatus when the image data producing program is executed in the computer system.

To achieve the above-mentioned object, the present invention provides an image data producing apparatus for producing proofing halftone dots image data representative of a proof image in which an image obtained by a printing system is simulated, said printing system printing the image in accordance with printing halftone dots image data subjected to halftone dots processing for multi-tone level image data, said image data producing apparatus comprising:

a halftone dots pattern data storage section for storing a plurality of sorts of halftone dots pattern data representative of a plurality of sorts of halftone dots patterns;

an image data obtaining section for obtaining the multi-tone level image data;

a halftone dots pattern selecting section for selecting a single halftone dots pattern according to an operation from among the plurality of sorts of halftone dots patterns represented by the plurality of sorts of halftone dots pattern data stored in said halftone dots pattern data storage section;

a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section; and an image data output section for outputting the proofing halftone dots image data produced by said halftone dots image data producing section.

In the image data producing apparatus as mentioned above according to the present invention, it is preferable that said halftone dots pattern data storage section stores the halftone dots pattern data representative of a plurality of sorts of halftone dots patterns in which at least one of substantial dots line numbers, substantial dots angles, halftone dots shapes, and output resolutions is different from one another, and said halftone dots pattern selecting section selects a single halftone dots pattern according to an operation from among the plurality of sorts of halftone dots patterns represented by the plurality of sorts of halftone dots pattern data stored in said halftone dots pattern data storage section.

Here, the "proof image" denotes an image in which an image to be printed in the above-mentioned printing system is reproduced through a process different from the actual printing process, using for example, a printer. Usually, a printing operator performs, prior to the actual printing work, a prior confirmation for the finish of an image to be printed in the printing system referring to the proof image.

The "multi-tone level image data" denotes image data defined in the density level at pixel positions by pixel values of multi-tone levels at the pixel positions arranged on a two-dimensional basis.

The "halftone dots processing" denotes to produce the "halftone dots image data" in which for example, a threshold matrix defined in a multi-tone level of pixel value as a threshold at each of pixel positions in a predetermined area (a dot cell) is effected onto the multi-tone level image data, that is, at each of a plurality of pixel positions, a pixel value of the multi-tone level image data is compared with a pixel value of the threshold matrix, the pixel value of the multi-tone level image data is binarized at the associated pixel position in accordance with the compared result, and a halftone dots processing is performed in such a manner that one halftone dot is provided for each dot cell.

The "halftone dots pattern" represents arrangements and shapes of the halftone dots. For example, a pixel value of the multi-tone level image data is compared with a pixel value of the threshold matrix, in case of a scheme wherein the binarization is performed in accordance with the compared result in magnitude of the pixel value, the halftone dots pattern is associated with the threshold matrix. The "halftone dots pattern data" represents such a halftone dots pattern. The halftone dots pattern data comprises for example, data of halftone dots pattern data itself such as data of the threshold matrix, and data of attributes such as halftone dots shapes representative of shapes of individual halftone dots, output resolutions each representative of density of the pixel of the halftone dots image, substantial halftone dots line numbers representative of actual density of lines on which individual halftone dots are lined, and substantial halftone dots angles representative of actual angles of lines on which individual halftone dots are lined.

According to the image data producing apparatus of the present invention, the halftone dots pattern selecting section selects one halftone dots pattern according to an operation from among the plurality of sorts of halftone dots patterns, and the halftone dots image data producing section produces the proofing halftone dots image data by means of subjecting the multi-tone level image data obtained by the image data obtaining section to the halftone dots processing based on the halftone dots pattern data representative of the halftone dots pattern selected by said halftone dots pattern selecting section. This feature makes it possible to produce image data representative of the proof image in which the halftone dots used in the printing system is reproduced by suitably selecting the halftone dots used in the printing system by the halftone dots pattern selecting section.

In the image data producing apparatus according to the present invention as mentioned above, it is preferable that the image data producing apparatus further comprises an operating halftone dots pattern obtaining section for obtaining halftone dots pattern data in which the halftone dots pattern data representative of the halftone dots pattern selected by said halftone dots pattern selecting section is subjected to at least one of operations of rotation, right and left reversal, and up and down reversal, and said halftone dots image data producing section produces the proofing halftone dots image data by means of subjecting the multi-tone level image data obtained by said image data obtaining section to the halftone dots processing based on the halftone dots pattern data obtained by said operating halftone dots pattern obtaining section.

The operating halftone dots pattern obtaining section may be one for reading from the halftone dots pattern storage section the halftone dots pattern data subjected to the above-mentioned operation, or alternatively one for producing the halftone dots pattern data.

As an image data producing apparatus, there is a type in which an image is rotated by 90° in direction of the image in accordance with a size of the image, and there is a type in which definition of the halftone dots angle is different. On the other hand, according to the image data producing apparatus having the operating halftone dots pattern obtaining section, the halftone dots pattern data subjected to the operations of rotation and reversal for the halftone dots pattern data are obtained in accordance with operation of a user or automatically, so that a direction of the halftone dots angle in the proof image is suitably controlled using the obtained halftone dots pattern data.

In the image data producing apparatus as mentioned above, it is preferable that said halftone dots pattern selecting section selects at least one of operations of rotation, right and left reversal, and up and down reversal, to which the halftone dots pattern data representative of the halftone dots pattern selected by said halftone dots pattern selecting section is further subjected, and said operating halftone dots pattern obtaining section obtains halftone dots pattern data subjected to the operation selected by said halftone dots pattern selecting section.

This feature makes it possible to control a direction of the halftone dots angle in the proof image in a desired direction.

In the image data producing apparatus as mentioned above, it is preferable that said halftone dots image data producing section has an operation determining section for determining as to whether a predetermined rotation operation is performed for the halftone dots pattern data representative of the halftone dots pattern selected by said halftone dots pattern selecting section, in accordance with an image size of the multi-tone level image data obtained by said multi-tone level image data obtaining section, and said operating halftone dots pattern obtaining section obtains halftone dots pattern data subjected to the predetermined rotation operation in accordance with a decision by said operation determining section.

In the event that the image data producing apparatus is a type in which an image is rotated by 90° in direction of the image in accordance with a size of the image, the halftone dots pattern is also rotated by 90° Thus, also in the direction of the image is rotated, according to the data producing apparatus of the present invention, it is possible to produce image data representative of the proof image in which the halftone dots used in the printing system is reproduced.

In the image data producing apparatus according to the present invention as mentioned above, it is preferable that the image data producing apparatus further comprises a first set up section for setting up contents of attributes of a halftone dots pattern in accordance with an operation, and a set up halftone dots pattern data obtaining section for obtaining halftone dots pattern data representative of the halftone dots pattern of which contents of attributes are set up, and said halftone dots pattern data storage section stores halftone dots pattern data obtained by said set up halftone dots pattern data obtaining section.

The set up halftone dots pattern data obtaining section may be one for reading from the halftone dots pattern storage section the halftone dots pattern data set up in contents of attributes by the first set up section, or alternatively one for producing the halftone dots pattern data.

Here, the attribute denotes the above-mentioned substantial dot line number, substantial dot angle, dot shape and output resolution. The contents of attribute denotes, for example, in case of the substantial dot angle, magnitude of angles such as 0° and 30°.

According to the image data producing apparatus according to the present invention as mentioned above, the first set up section sets up desired contents of attributes of a halftone dots pattern in accordance with an operation, and halftone dots pattern data representative of the halftone dots pattern of which contents of attributes are set up are stored in the halftone dots pattern storage section and are used for reproducing the halftone dots used in the printing system into the proof image.

In the image data producing apparatus as mentioned above, it is preferable that the image data producing apparatus further comprises a display section for displaying a list of contents of attributes of a halftone dots pattern, and a contents selecting section for selecting contents of attributes according to an operation from the list of contents of attributes displayed by said display section, and said first set up section sets up the contents of attributes selected by said contents selecting section.

This feature makes it possible to set up the contents of attributes of the halftone dots pattern by means of simply performing a simple operation of selecting contents of attributes of the halftone dots pattern from a list displayed by the display section.

In the image data producing apparatus according to the present invention as mentioned above, it is preferable that said halftone dots pattern data storage section stores types of a plurality of types of output machines including an output machine for outputting an image based on the printing halftone dots image data, and halftone dots pattern data representative of a plurality of sorts of halftone dots patterns used in the types of the plurality of types of output machines, in form of their association, and said halftone dots pattern selecting section selects a single type according to an operation from among the plurality of types of output machines stored in said halftone dots pattern data storage section and thereby selecting a halftone dots pattern used in the selected type of the output machine.

This feature makes it possible to produce the proof image representing the halftone dots pattern by means of simply selecting a type of machine of the output machine used in the printing system.

In the above-mentioned image data producing apparatus, it is preferable that the image data producing apparatus further comprises a second set up section for setting up a type of an output machine, and halftone dots pattern data representative of the halftone dots pattern used in the type of the output machine, and said halftone dots pattern data storage section stores the type set up by said second set up section, and halftone dots pattern data representative of the halftone dots patterns set up by said second set up section, in form of their association.

This feature makes it possible for a user to set up the halftone dots pattern data representative of the halftone dots patterns used in a desired type of output machine.

In the image data producing apparatus according to the present invention as mentioned above, it is preferable that the image data producing apparatus further comprises a gradation conversion section for subjecting the multi-tone level image data obtained by said image data obtaining section to a gradation conversion processing, and said halftone dots image data producing section produces the proofing halftone dots image data by means of subjecting the multi-tone level image data subjected to the gradation conversion processing by said gradation conversion section to the halftone dots processing.

This feature makes it possible to produce image data representative of the proof image reproducing the image to be printed by the printing system on the gradation and the halftone dots pattern.

In the image data producing apparatus according to the present invention as mentioned above, the image data producing apparatus further comprises a color conversion section for subjecting the multi-tone level image data obtained by said image data obtaining section to a color conversion processing, and said halftone dots image data producing section produces the proofing halftone dots image data by means of subjecting the multi-tone level image data subjected to the color conversion processing by said color conversion section to the halftone dots processing.

This feature makes it possible to produce image data representative of the proof image reproducing the image to be printed by the printing system on the color and the halftone dots pattern.

To achieve the above-mentioned object, the present invention provides an image data producing program storage medium storing an image data producing program which causes a computer system to operate as an image data producing apparatus for producing proofing halftone dots image data representative of a proof image in which an image obtained by a printing system is simulated, said printing system printing the image in accordance with printing halftone dots image data subjected to halftone dots processing for multi-tone level image data, when the image data producing program is executed in the computer system, wherein said image data producing program storage medium stores the image data producing program comprising:

an image data obtaining section for obtaining the multi-tone level image data;

a halftone dots pattern selecting section for selecting a single halftone dots pattern according to an operation from among the plurality of sorts of halftone dots patterns represented by a plurality of sorts of halftone dots pattern data;

a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section; and an image data output section for outputting the proofing halftone dots image data produced by said halftone dots image data producing section.

The computer system, which operates, when the image data producing program is executed in the computer system, as an image data producing apparatus, has the same effect as the image data producing apparatus of the present invention as mentioned above.

While the similar names are applied to the structural elements in the image data producing apparatus and the image data producing program storage medium, those structural elements mean the hardware and the software in the image data producing apparatus, and mean only the software in the image data producing program storage medium.

BRIEF DESCRIPTION OF THE DRAWINGS

FIG. 6 is a view of a screen of a halftone dots pattern registration data list.

DETAILED DESCRIPTION OF PREFERRED EMBODIMENTS

Embodiments of the present invention will be described with reference to the accompanying drawings.

Figure 1:
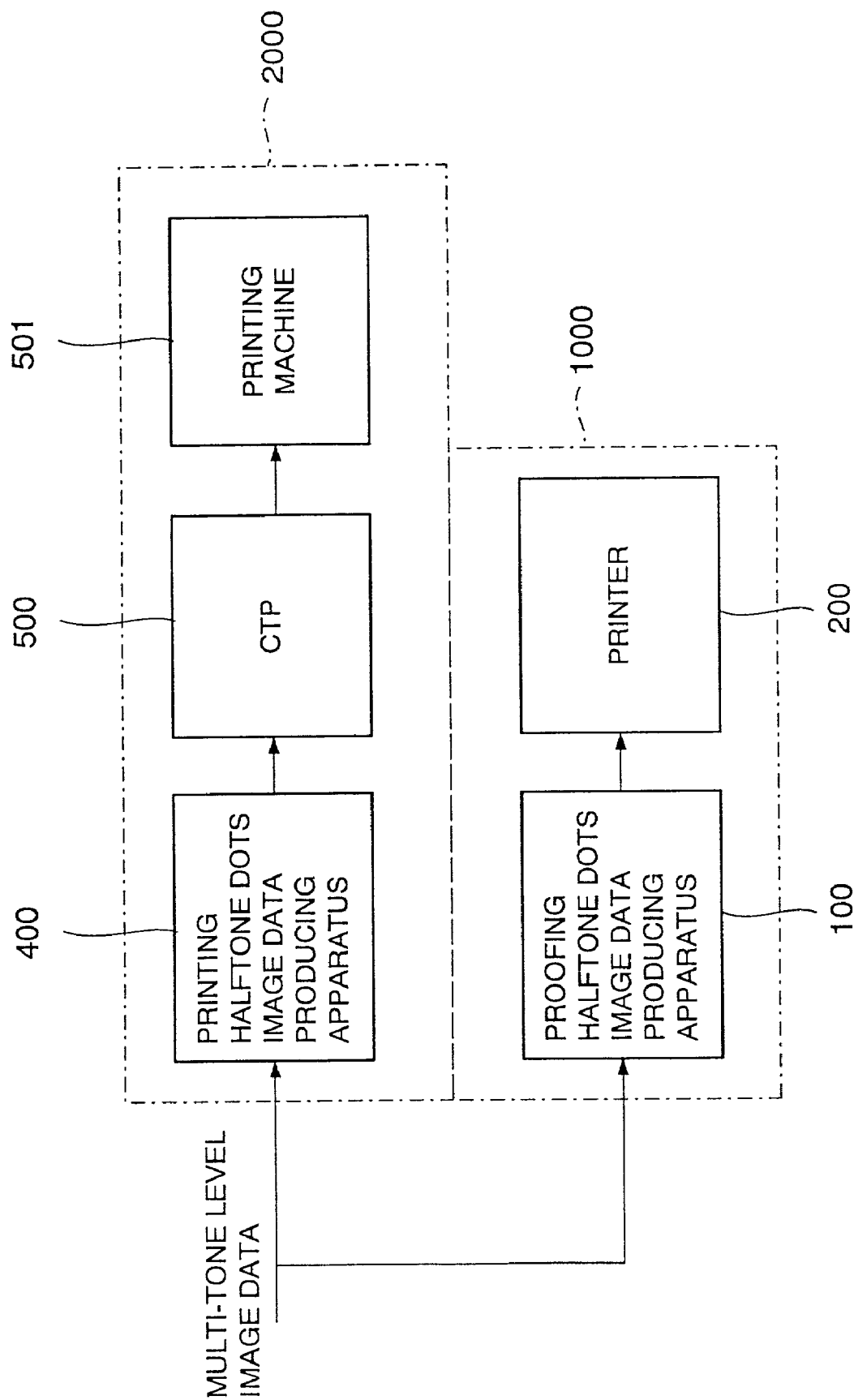
FIG. 1 is a schematic constitution view of a printing system and a proofer including a proofing image data producing apparatus according to an embodiment of the present invention.

FIG. 1 is a schematic constitution view of a printing system and a proofer including a proofing image data producing apparatus according to an embodiment of the present invention.

Figure 13:
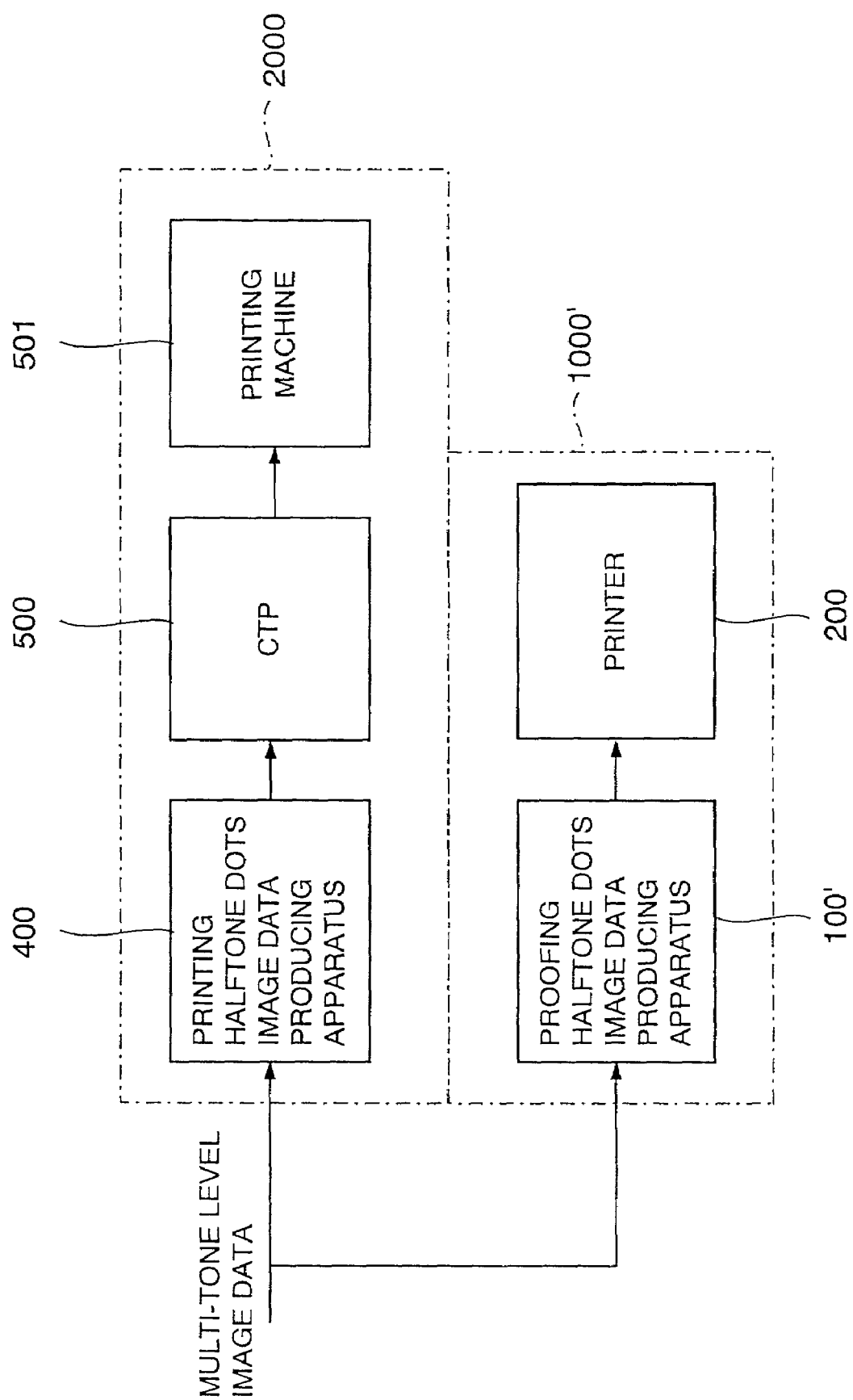
FIG. 13 is a schematic construction view of a conventional proofer and a printing system.

FIG. 1 shows a printing system 2000 and a proofer 1000. The printing system 2000 is the same as that showing in FIG. 13. The proofer 1000 is different from the conventional proofer 1000' shown in FIG. 13 in the point that the proofing halftone dots image data producing apparatus 100' is replaced by a proofing halftone dots image data producing apparatus 100. The printing system 2000 and the proofer 1000 are implemented by for example, a printing system and a proofer shown in FIG. 2.

Figure 2:
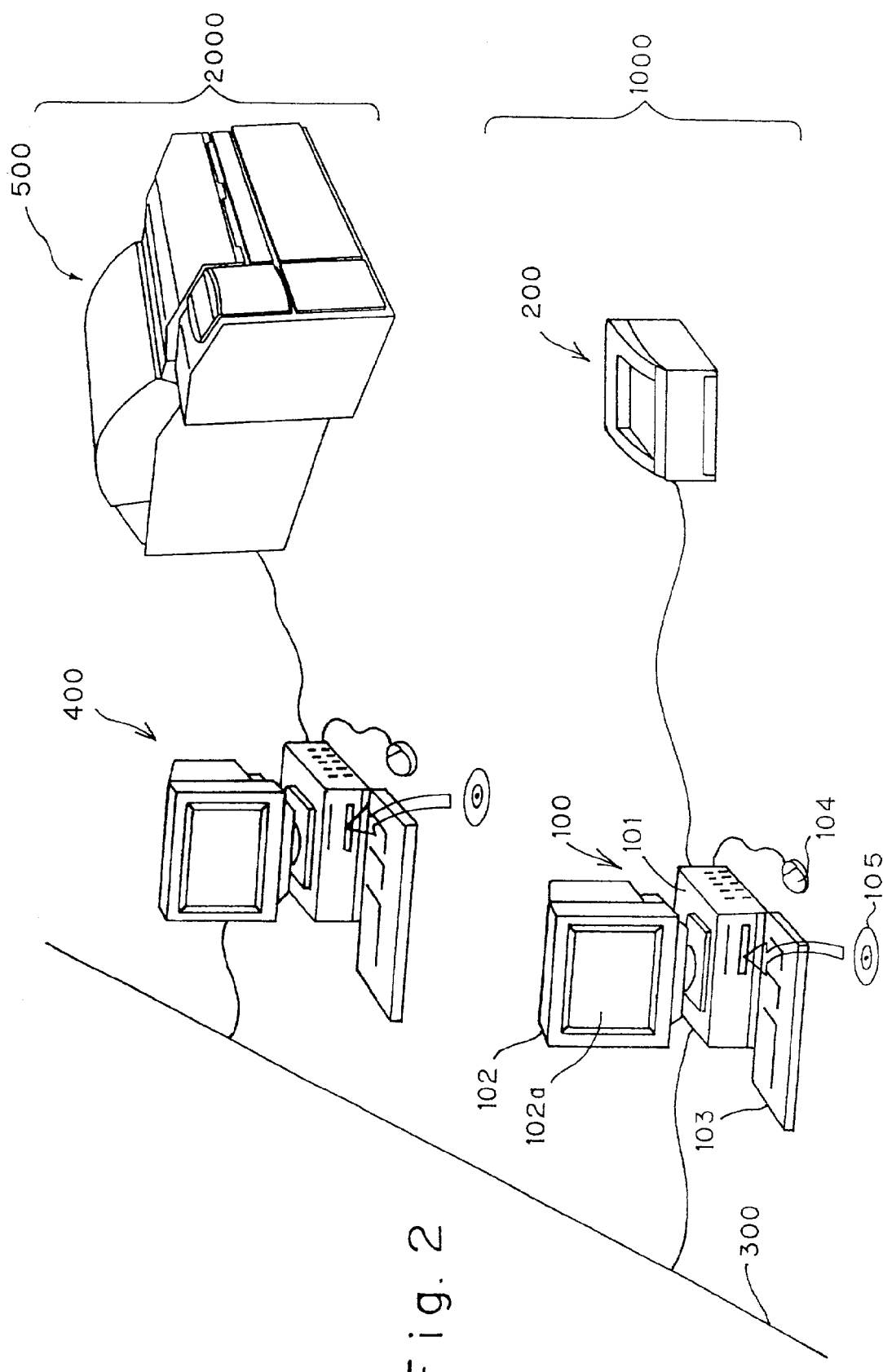
FIG. 2 is a perspective view of a printing system and a proofer including a proofing image data producing apparatus according to an embodiment of the present invention.

FIG. 2 is a perspective view of a printing system and a proofer including a proofing image data producing apparatus according to an embodiment of the present invention.

In FIG. 2, a proofer 1000 comprises a computer system 100 and a printer 200. A printing system 2000 comprises a computer system 400, a CTP 500 and a printing system 501 (not shown in FIG. 2). The computer system 100 is connected via a communication network 300 to the computer system 400. The communication network 300 is also connected to another external computer system (not shown).

The computer system 400 of the printing system 2000 shown in FIG. 2 receives for example, multi-tone level image data for C, M, Y, K-plates, via the communication network 300 from the external computer system. It is acceptable that those multi-tone level image data are fed through a storage medium such as a CD-R (Compact Disc Recordable) and MO (Optical Magnetic disk) other than passing through the communication network 300. The computer system 400 serves as the printing halftone dots image data producing apparatus 400 shown in FIG. 1. In the computer system 400, the received multi-tone level image data is subjected to a halftone dots processing to produce printing halftone dots image data.

The printing halftone dots image data produced by the computer system 400 is transferred to the CTP 500 which produces a printing plate wherein an image represented by the halftone dots image data thus transferred is directly printed. The printing plate produced by the CTP 500 is wound, in the event that the printing machine 501 has for example a drum, onto the drum. In the printing machine 501, ink is applied to the printing plate on the drum to perform a continuous printing for a halftone dots image. Incidentally, it is acceptable that the printing plate is produced in accordance with a film which is formed in such a manner that the image represented by the above-mentioned halftone dots image data is formed on the film by a so-called film setter.

In this manner, a series of printing work by the printing system 2000 is large-scale ones and takes a lot of cost. For this reason, a printing operator performs, prior to the actual printing work, a prior confirmation for the finish of an image to be printed in the printing system 2000 using a proof image produced by the proofer 1000 in such a manner as set forth below.

The computer system 100 of the proofer 1000 receives, in a similar fashion to that of the computer system 400 of the printing system 2000 shown in FIG. 2, the multi-tone level image data for C, M, Y, K-plates, via the communication network 300, or a storage medium such as a CD-R and MO. The computer system 100 serves as the proofing image data producing apparatus of the embodiment of the present invention. In the computer system 100, the received multi-tone level image data is converted into proofing halftone dots image data. The converted proofing halftone dots image data is outputted to the printer 200. Upon receipt of the proofing halftone dots image data, the printer 200 prints out a proof image on a recording sheet in accordance with received proofing halftone dots image data.

It is acceptable that the proof image is displayed on for example, a display of the computer system 100, not restricted to one outputted onto the recording sheet. In the event that the proof image is outputted onto the display, the computer system 100 independently serves as the proofer.

In the event that the computer systems 100 and 400 are provided with a RIP (Raster Image Processor) for converting page description data described with postscript language and the like into data representative of a bit map image, such as the multi-tone level image data, it is acceptable that data to be fed to the computer systems 100 and 400 is the page description data but not the multi-tone level image data. When the computer systems 100 and 400 receive the same page description data, the computer systems 100 and 400 produce the same multi-tone level image data and convert the multi-tone level image data into the halftone dots image data.

The proof image outputted in the manner as mentioned above reproduces the image printed by the printing machine 501 with respect to not only color but also the halftone dots pattern. As will be described latter, adjustments of the color and the halftone dots pattern are performed by the computer system 100.

The proofer 1000 shown in FIG. 1 is characterized, as compared with the conventional proofer 1000', by processing contents to be carried out by the computer system 100 which serves as the proofing halftone dots image data producing apparatus 100. Thus, hereinafter, there will be described the computer system 100. Incidentally, the computer system 400 used in the printing system 2000 also has on a hardware basis the same structure as the computer system 100 used in the proofer 1000.

The computer system 100 comprises a main frame unit 101 incorporating therein a CPU, a main memory unit, a hard disk, a communication board, etc., a CRT display 102 performing a display for a picture and a character string on a display screen 102a in accordance with an instruction from the main frame unit 101, a keyboard 103 for inputting instructions of a user and character information to the computer system 100, and a mouse 104 for inputting an instruction according to an icon or the like displayed on a position designated on the display screen 102a.

A hardware structural of the computer system 100 is as follows.

Figure 3:
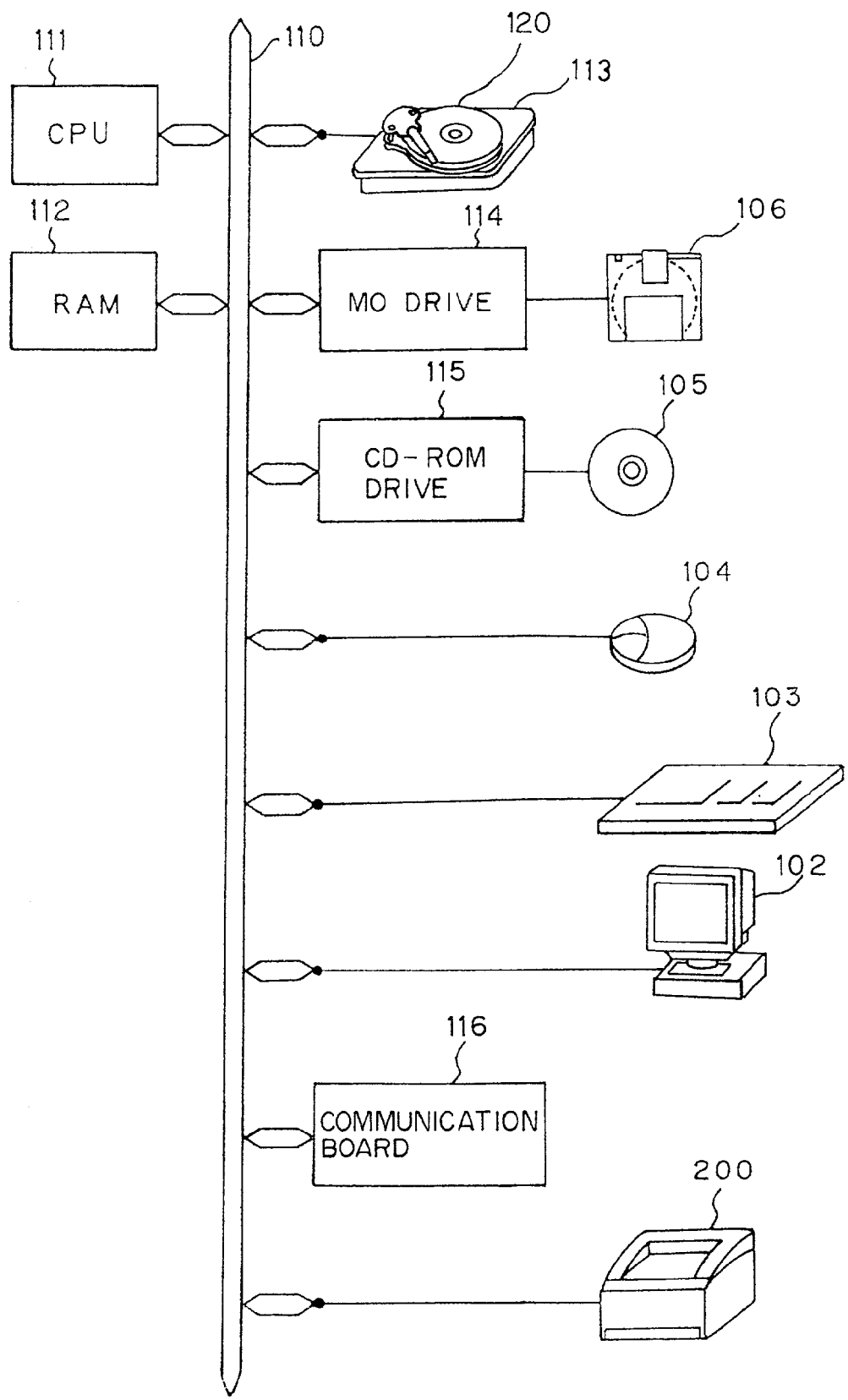
FIG. 3 is a hardware structural view of a computer system.

FIG. 3 is a hardware structural view of a computer system.

The hardware structural view of the computer system shows a CPU (central processing unit) 111, a RAM 112, an HDD (hard disk drive) 113, an MO drive 114, a CD-ROM drive 115, and a communication board 116. Those elements are mutually connected through a bus 110.

The HDD 113 incorporates therein a hard disk 120, as a recording medium, for recording and reproducing.

The communication board 116 is connected to a communication line such as a LAN. The computer system 100 shown in FIG. 2 can transmit and receive data between it and the computer system 400 and another computer system as well through the communication network 300 connected via the communication board 116.

Further, the hardware structural view of the computer system shows a mouse 104, a keyboard 103, a CRT display 102 and a printer 200, which are connected via a plurality of I/O interfaces (not illustrated) to the bus 110. Incidentally, in the computer system 400 shown in FIG. 2, the CTP 500 instead of the printer 200 is connected via an I/O interface (not illustrated) to the bus 110.

Figure 4:
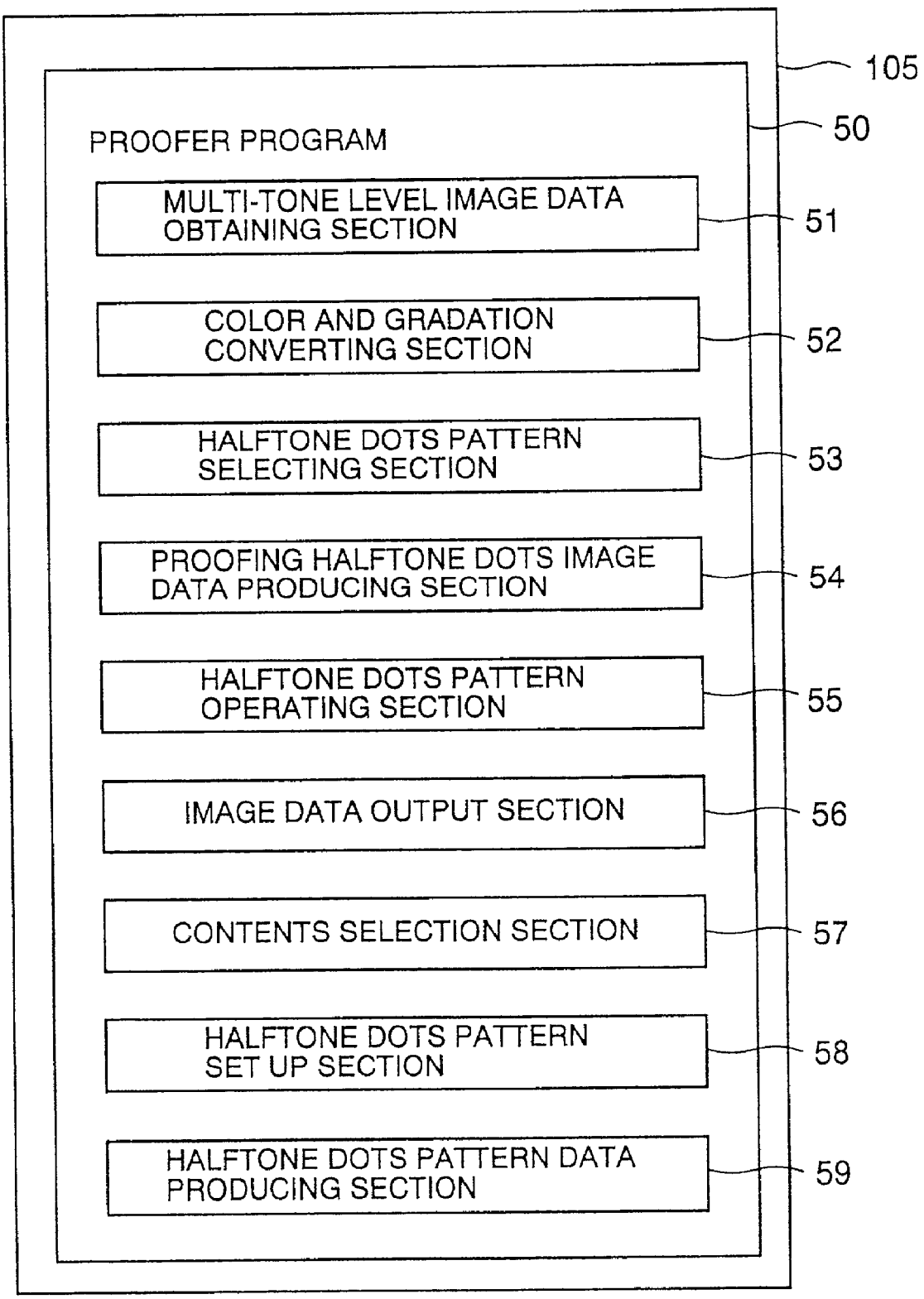
FIG. 4 is a view showing an embodiment of an image data producing program storage medium of the present invention.

FIG. 4 is a view showing an embodiment of an image data producing program storage medium of the present invention.

According to the present embodiment, a CD-ROM 105 stores an image data producing program referred to in the present invention. The CD-ROM 105 storing the image data producing program corresponds to an embodiment of an image data producing program storage medium of the present invention.

An image data producing program 50 stored in the CD-ROM 105 includes, as a software, a multi-tone level image data obtaining section 51, a color and gradation converting section 52, a halftone dots pattern selecting section 53, a proofing halftone dots image data producing section 54, a halftone dots pattern operating section 55, an image data output section 56, a contents selection section 57, a halftone dots pattern set up section 58, and a halftone dots pattern data producing section 59.

The CD-ROM 105 is loaded onto the main frame unit 101 so that the image data producing program 50 stored in the CD-ROM 105 is read by the CD-ROM drive 115 and is installed via the bus 110 onto the hard disk 120 by the hard disk drive HDD 113.

When the image data producing program 50 installed onto the hard disk 120 is started, the image data producing program 50 is loaded onto the RAM 112 and is executed by the CPU 111. That is, in the computer system 100, there are implemented a multi-tone level image data obtaining section, a color and gradation converting section, a halftone dots pattern selecting section, a proofing image data producing section, a halftone dots pattern operating section, an image data output section, a contents selection section, a halftone dots pattern set up section, and a halftone dots pattern data producing section, which comprise both a software and a hardware as environment for operating the software, and will be described later. The computer system 100 serves as the proofing halftone dots image data producing apparatus 100, when those sections are implemented.

While the image data producing program 50 stored in the CD-ROM 105 is installed onto the hard disk of the computer system 100 in the manner as mentioned above, the hard disk, onto which the image data producing program 50 is installed, also corresponds to an embodiment of an image data producing program storage medium of the present invention.

In the computer system 100 shown in FIG. 1, there is used the CD-ROM 105 as the program storage medium for storing the image data producing program 50. However, the medium for storing the image data producing program referred to in the present invention is not restricted to the CD-ROM, and it is acceptable that the medium for storing the image data producing program referred to in the present invention is storage medium such as an optical disk, a magneto-optical disk (MO), a floppy disk, and a magnetic tape. The program storage medium storing the image data producing program corresponds to an embodiment of an image data producing program storage medium of the present invention.

Next, there will be described functions of the respective sections constituting the proofing halftone dots image data producing apparatus 100.

Figure 5:
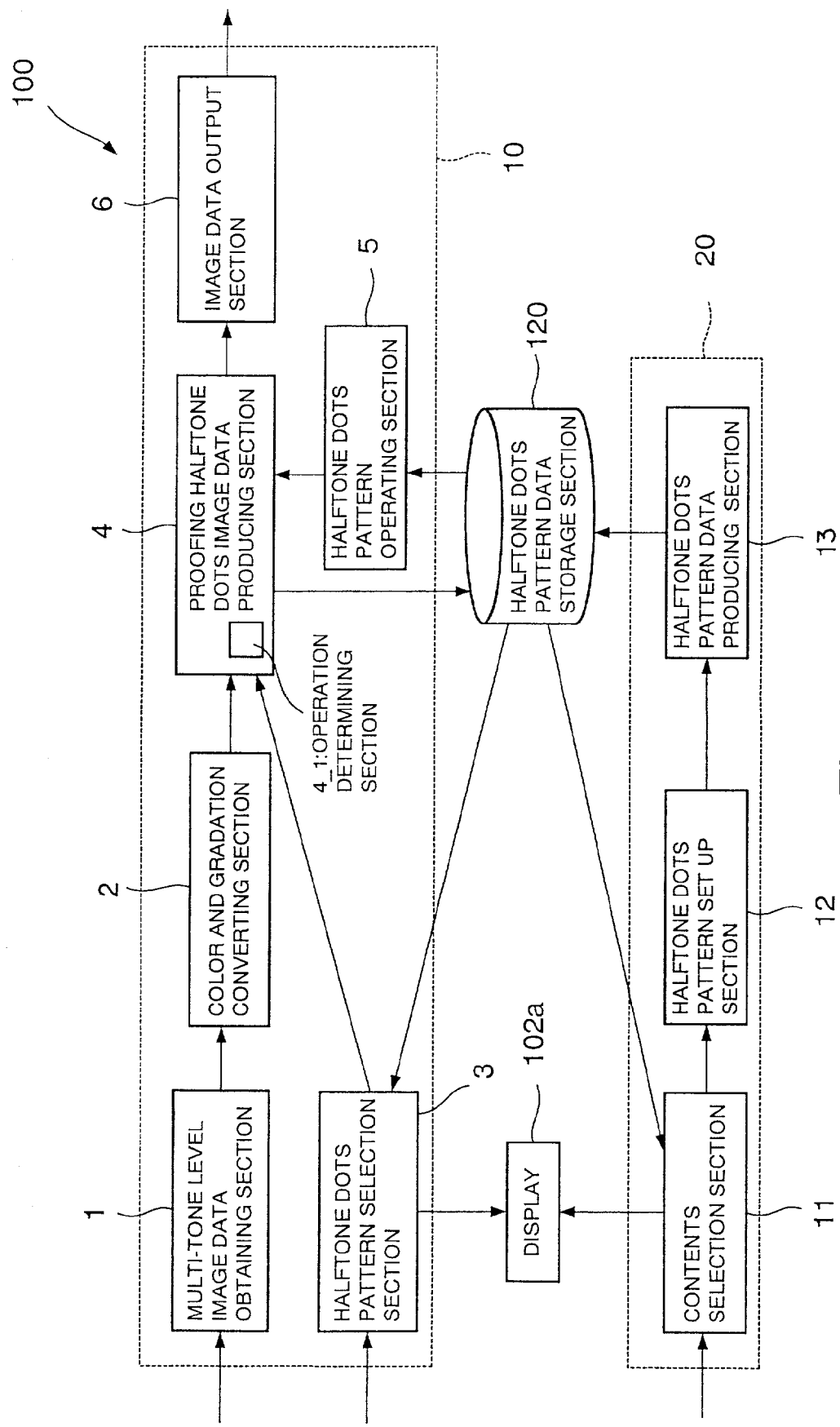
FIG. 5 is a schematic constitution view of a proofing image data producing apparatus according to an embodiment of the present invention.

FIG. 5 is a schematic constitution view of a proofing image data producing apparatus according to an embodiment of the present invention.

A proofing halftone dots image data producing apparatus 100 shown in FIG. 5 comprises: a halftone dots image data producing part 10 comprising a multi-tone level image data obtaining section 1, a color and gradation converting section 2, a halftone dots pattern selecting section 3, a proofing halftone dots image data producing section 4, a halftone dots pattern operating section 5, and an image data output section 6; a halftone dots pattern set up part 20 comprising a contents selection section 11, a halftone dots pattern set up section 12, and a halftone dots pattern data producing section 13; a halftone dots pattern data storage section 120; and a display section 102a. The color and gradation converting section 2 corresponds to one serving both as the color conversion section and the gradation conversion section referred to in the present invention. The halftone dots pattern set up section 12 corresponds to one serving both as the first set up section and the second set up section referred to in the present invention. The halftone dots pattern operating section 5 corresponds to the operation halftone dots pattern data obtaining section referred to in the present invention. The halftone dots pattern data producing section 13 corresponds to the set up halftone dots pattern data obtaining section referred to in the present invention.

The halftone dots pattern data storage section 120 stores halftone dots pattern data representative of a plurality of sorts of halftone dots patterns, and a plurality of attributes of each of the halftone dots patterns and a plurality of contents of each of the attributes. The halftone dots pattern data includes an output resolution, a dot shape, a dot line number, a dot angle, a substantial dot line number, a substantial dot angle, a threshold matrix of halftone dots, etc., which will be described later in detail. The halftone dots pattern data are stored in form of an association with data specifying a halftone dots pattern and halftone dots pattern data, such as names of halftone dots patterns and names of output machines.

The halftone dots image data producing part 10 obtains multi-tone level image data and produces proofing halftone dots image data in accordance with the halftone dots pattern data read from the halftone dots pattern data storage section 120.

The halftone dots pattern set up part 20 sets up a halftone dots pattern and generates halftone dots pattern data representative of the halftone dots pattern. The generated halftone dots pattern data is stored in the halftone dots pattern data storage section 120.

The display section 102a denotes a display screen 102a of the CRT display 102. On the display section 102a, there are displayed names and attributes of various halftone dots patterns, and set up screens for setting up the halftone dots patterns. For example, a screen of a halftone dots pattern registration data list shown in FIG. 6 is also one of the screens displayed on the display section 102a.

FIG. 6 is a view of a screen of a halftone dots pattern registration data list.

On the screen of the halftone dots pattern registration data list shown in FIG. 6, there are shown halftone dots pattern names, output machine names, output resolutions, halftone dots shapes, halftone dots line numbers, and halftone dots angles, of halftone dots patterns represented by halftone dots pattern data stored in the halftone dots pattern data storage section 120.

The halftone dots pattern names specify the halftone dots pattern, for example, "T900 standard dots".

The output machine names denote, for example, a name of an output machine for an image, such as the CTP 500 of the printing system 2000. In general, the halftone dots pattern to be used is determined for each output machine. The output machine name specifies the halftone dots pattern. Here, for example, "Luxel T9000 CTP" is raised.

The output resolutions denote density of pixels of a halftone dots image. "2438.4 dpi" here raised denotes 2438.4 dots/inch, that is, density of about 960 pixels/cm.

The halftone dots shapes denote shapes of individual halftone dots, such as a "square" indicative of a diamond, an "elliptical" indicative of an ellipse, and a "round" indicative of a circle. The halftone dots shapes are defined by for example, a threshold matrix used when halftone dots are formed.

The halftone dots line numbers denote density of lines on which halftone dots are lined. "175$^{lpi}$" raised here denotes density of 175 lines/inch, that is, density of 68.9 lines/cm.

The halftone dots angles denote angles of lines on each of which halftone dots are lined. Here, the halftone dots angles on the halftone dots for C, M, Y, K plates are expressed by 15°, 45°, 0° and 75°.

Usually, the actual halftone dots for C, M, Y, K plates are slightly different in the halftone dots line numbers and the halftone dots angles. The actual halftone dots line numbers are referred to as the substantial halftone dots line numbers. The actual halftone dots angles are referred to as the substantial halftone dots angles. Here, the substantial halftone dots line numbers are expressed by 177.3$^{lpi}$, 178.2$^{lpi}$, 174.8$^{lpi}$, and 177.3$^{lpi}$ for C, M, Y, K plates. The actual halftone dots angles are expressed by 15.03°, 45°, 0°, and 74.97° for C, M, Y, K plates.

Again referring to FIG. 5, there will be described the respective sections constituting the halftone dots image data producing part 10 of the proofing halftone dots image data producing apparatus 100. In the explanation of those respective sections, the operations of those respective sections will be described in conjunction with a flowchart shown in FIG. 7.

Figure 7:
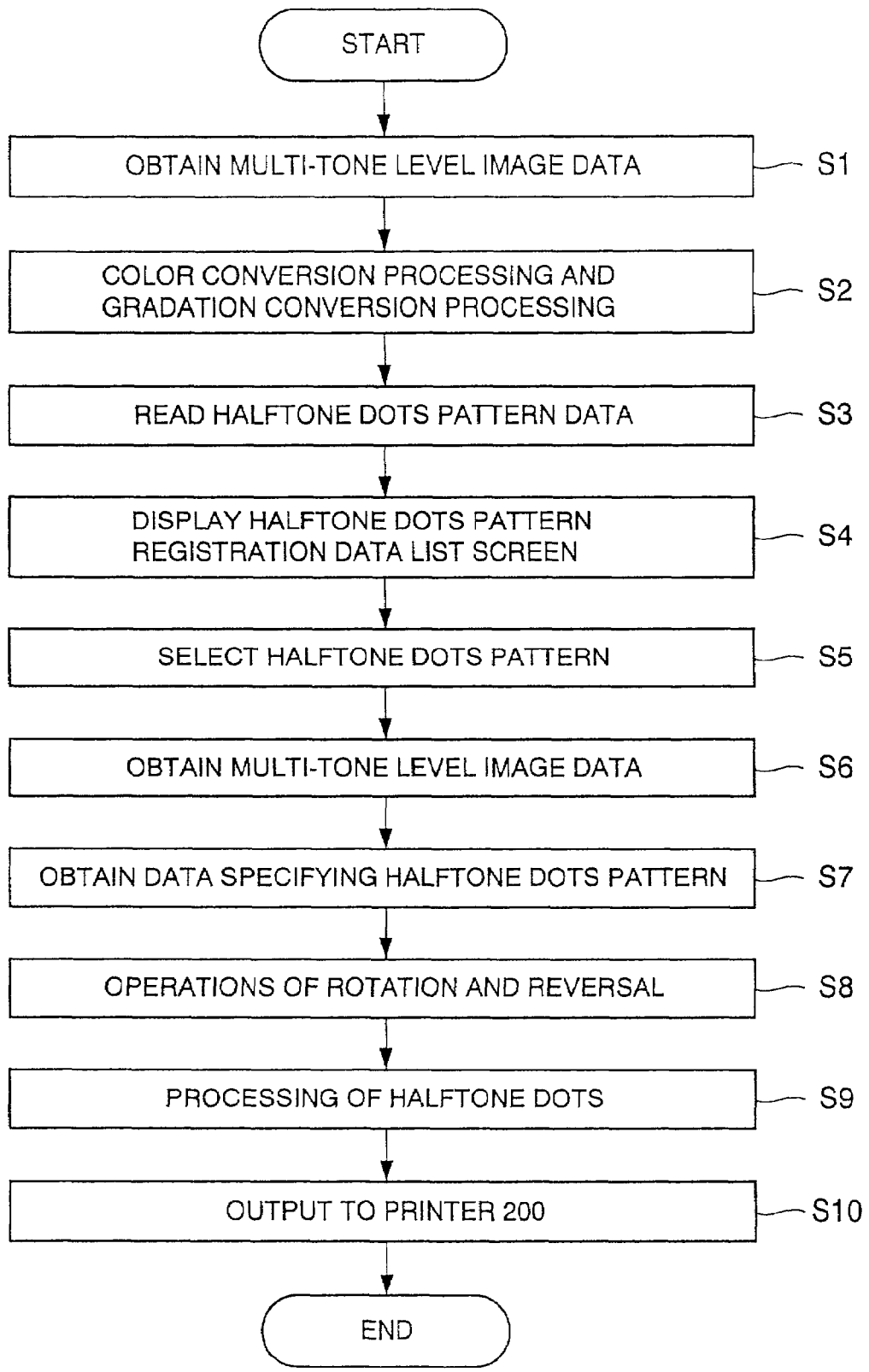
FIG. 7 is a flowchart useful for understanding a process of producing a proofing image in a proofing image producing apparatus according to an embodiment of the present invention.

FIG. 7 is a flowchart useful for understanding a process of producing a proofing image in a proofing image producing apparatus according to an embodiment of the present invention.

The multi-tone level image data obtaining section 1 of the halftone dots image data producing part 10 obtains multi-tone level image data. First, the multi-tone level image data obtaining section 1 obtains multi-tone level image data which is the same as that fed to the computer system 400 (step S1).

The color and gradation converting section 2 applies color conversion processing and gradation conversion processing to the multi-tone level image data obtained by the multi-tone level image data obtaining section 1.

The color and gradation converting section 2 subjects the multi-tone level image data obtained by the multi-tone level image data obtaining section 1 to color conversion processing and gradation conversion processing for correcting differences in color reproduction characteristics and gradation reproduction characteristics between the printing system 2000 and the proofer 1000 in such a manner that a color of a proofer image finally outputted from the printer 200 by the proofer 1000 reproduces color and gradation of a color-printed image finally outputted from the printing machine 501 by the printing system 2000 (step S2).

The halftone dots pattern selecting section 3 selects one halftone dots pattern from among a plurality of sorts of halftone dots patterns represented by a plurality of sorts of halftone dots pattern data stored in the halftone dots pattern data storage section 120 in accordance with an operation of a user. Further, the halftone dots pattern selecting section 3 selects at least one operation from among a rotation operation, a right and left reversal operation and an up and down reversal operation, which are applied to the halftone dots pattern data representative of the halftone dots pattern thus selected, in accordance with an operation of a user.

The halftone dots pattern selecting section 3 first reads from the halftone dots pattern data storage section 120 a plurality of halftone dots pattern data representative of various sorts of halftone dots patterns and data specifying those halftone dots pattern data (step S3), and causes the display section 102a to display the screen of halftone dots pattern registration data list shown in FIG. 6 (step S4). An user operates the mouse while looking the screen of halftone dots pattern registration data list. The halftone dots pattern selecting section 3 selects one of the halftone dots patterns in accordance with an operation of the user (step S5).

As shown in FIG. 6, on the screen of halftone dots pattern registration data list, there are provided a data read button a1, a delete button a2, a cancel button a3, an up and down reversal button a4, a right and left reversal button a5, a 90° rotation button a6, a 180° rotation button a7, and a 270° rotation button a8. In the event that a user wishes to subject the selected halftone dots pattern to the operations of up and down reversal, right and left reversal, 90° rotation, 180° rotation, and 270° rotation, it is effective that the user depresses the up and down reversal button a4, the right and left reversal button a5, the 90° rotation button a6, the 180° rotation button a7, and the 270° rotation button a8, respectively. Depression of any one of those buttons produces data representative of the operation according to the depressed button.

When a user depresses the data read button a1, data specifying the selected halftone dots pattern, such as a name of the selected halftone dots, operations for the selected rotation and reversals, is transferred to the proofing halftone dots image data producing section 4. When the delete button a2 is depressed, the halftone dots pattern data representative of the selected halftone dots pattern and data specifying the halftone dots pattern are deleted from the halftone dots pattern data storage section 120. When the cancel button a3 is depressed, the screen of the halftone dots pattern registration data list disappears from the display section 102a.

The proofing halftone dots image data producing section 4 subjects multi-tone level image data subjected to the color conversion processing and the gradation conversion processing by the color and gradation converting section 2 to the halftone dots processing based on the halftone dots pattern data representative of the halftone dots pattern selected by the halftone dots pattern selecting section 3 to produce proofing halftone dots image data. The proofing halftone dots image data producing section 4 has an operation determining section 4_1 for determining as to whether a predetermined rotation operation is performed for the halftone dots pattern data representative of the halftone dots pattern selected by the halftone dots pattern selecting section 3, in accordance with an image size of the multi-tone level image data obtained by the multi-tone level image data obtaining section 1.

The proofing halftone dots image data producing section 4 first obtains the multi-tone level image data subjected to the color conversion and the gradation conversion from the gradation converting section 2 (step S6), and obtains data specifying the halftone dots pattern selected by the halftone dots pattern selecting section 3 (step S7) to read the halftone dots pattern data specified by the obtained data from the halftone dots pattern data storage section 120. Further, the proofing halftone dots image data producing section 4 subjects multi-tone level image data thus obtained to the halftone dots processing based on the halftone dots pattern data thus read to produce proofing halftone dots image data.

Incidentally, even if the halftone dots pattern selecting section 3 does not perform the selection of the rotation and reversal operations, when it is automatically determined by the operation determining section 4_1 that the halftone dots pattern selected by the halftone dots pattern selecting section 3 is subjected to the rotation operation, information to perform the rotation operation is added to the data specifying the halftone dots pattern.

The halftone dots pattern operating section 5 applies at least one operation of the rotation operation, the right and left reversal operation and the up and down reversal operation to the halftone dots pattern stored in the halftone dots pattern data storage section 120. In the event that the halftone dots pattern selecting section 3 selects the rotation and reversal operations, and in the event that the operation determining section 4_1 determines that the rotation operation is performed, when the halftone dots pattern data is read from the halftone dots pattern data storage section 120, the halftone dots pattern data is temporarily transferred to the halftone dots pattern operating section 5 so that the halftone dots pattern operating section 5 subjects the halftone dots pattern data to the rotation operation and the reversal operation in accordance with information of the rotation and reversal operations included in the data specifying the halftone dots pattern (step S8). In this case, the halftone dots pattern data subjected to the rotation operation and the reversal operation by the halftone dots pattern operating section 5 is transferred to the proofing halftone dots image data producing section 4. The proofing halftone dots image data producing section 4 subjects the obtained multi-tone level image data to the halftone dots processing in accordance with the halftone dots pattern data subjected to the rotation operation and the reversal operation (step S9). The operation by the halftone dots pattern operating section 5 will be described later more in detail.

The image data output section 6 receives the proofing halftone dots image data produced by the proofing halftone dots image data producing section 4 and outputs the same to the printer 200 (step S10). Upon receipt of the proofing halftone dots image data, the printer 200 prints out a proof image on a recording sheet in accordance with the received proofing halftone dots image data. On the proof image, an image to be obtained by the printing system 2000 is reproduced with respect to not only color and gradation but also a halftone dots pattern.

In the manner as mentioned above, a user can produce image data representative of a proof image reproducing a halftone dots pattern of an image to be printed by the printing system 2000 by means of simply selecting a name of a halftone dots pattern used in the printing system 2000, or selecting a type of machine of the output machine (CTP 500) used in the printing system 2000 using the proofing halftone dots image data producing apparatus 100.

Next, there will be described the respective sections constituting the halftone dots pattern set up part 20 of the proofing halftone dots image data producing apparatus 100. In the explanation of the respective sections, operations of those sections will be explained in conjunction with a flowchart shown in FIG. 8.

Figure 8:
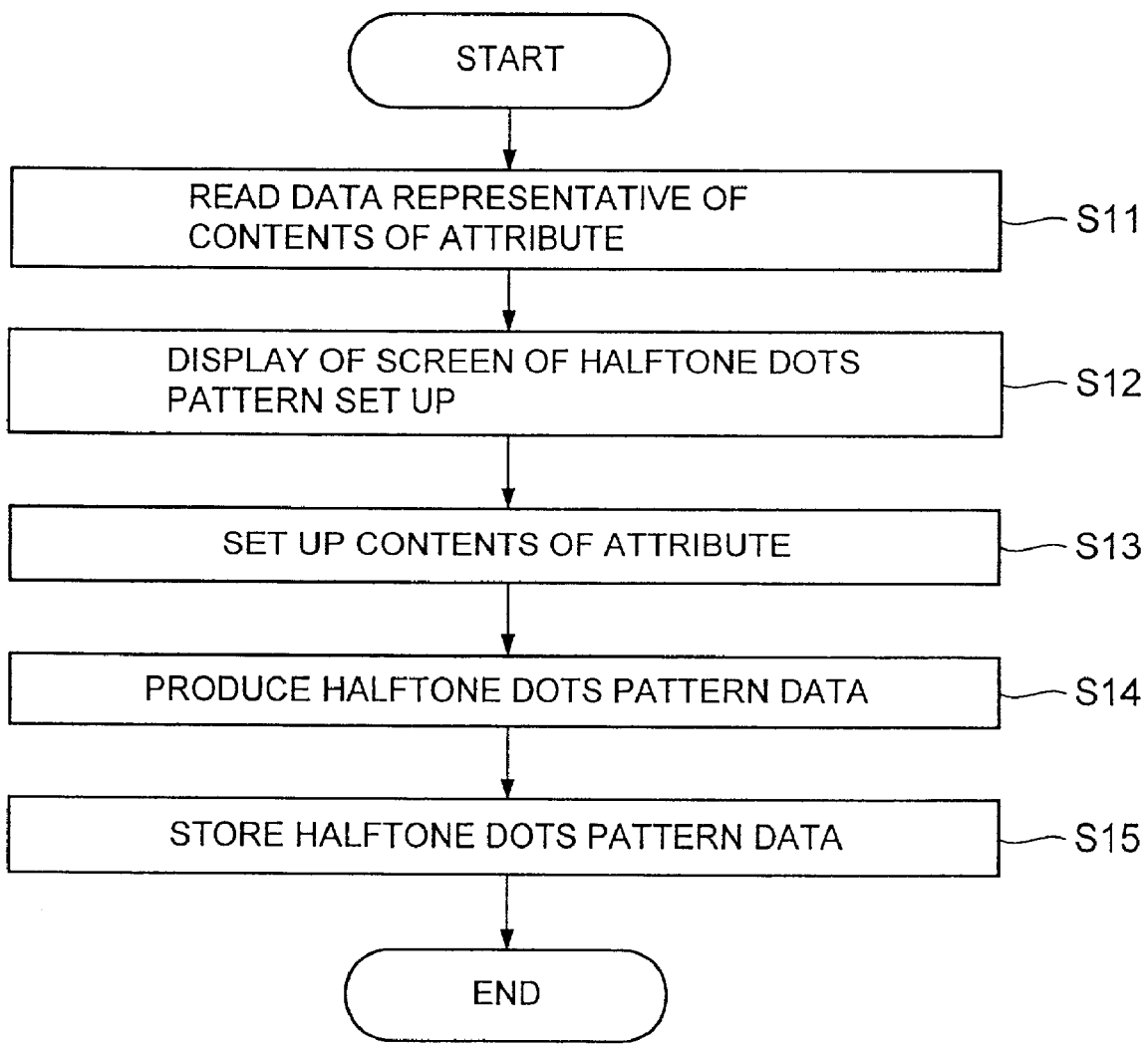
FIG. 8 is a flowchart useful for understanding a process of setting up and producing a halftone dot pattern in a proofing image producing apparatus according to an embodiment of the present invention.

FIG. 8 is a flowchart useful for understanding a process of setting up and producing a halftone dot pattern in a proofing image producing apparatus according to an embodiment of the present invention.

The contents selection section 11 causes the display section 102a to display a list of contents of attributes of a halftone dots pattern, and selects contents of the attributes from the list of contents of attributes of a halftone dots pattern in accordance with a selection operation for contents of the attributes performed by a user referring to the list.

Figure 9:
FIG. 9 is a view of a screen of a halftone dots pattern attribute set up.

The contents selection section 11 first reads data representative of contents of attributes of a halftone dots pattern stored in the halftone dots pattern data storage section 120 (step S11), and then causes the display section 102a to display a screen of a halftone dots pattern attribute set up shown in FIG. 9 (step S12).

FIG. 9 is a view of a screen of a halftone dots pattern attribute set up.

FIG. 9 shows lists of contents of output resolutions, halftone dots shapes, halftone dots line numbers, and halftone dots angle sets, which are attributes of a halftone dots pattern, and a list of output machine names as well.

With respect to the output machine names, there is shown a list of output machines such as [Luxel T900CTP], [Luxel F9000], [Luxel P5600CTP], etc. Here, of the output machines, the portion of [Luxel T9000CTP], which is selected in accordance with the operation of a user, is emphasized as shown with slashes, and a name of the selected output machine is displayed with a different frame from the list.

Likewise, with respect to the output resolutions, the halftone dots shapes, the halftone dots line numbers, and the halftone dots angle sets, the lists of the contents are displayed, the emphasis and the display with different frames for contents selected from among the contents included in the list are performed.

With respect to the output resolutions, there is shown a list of the output resolutions such as ⌈1000dpi⌉, ⌈2400dpi⌉, ⌈2438.4dpi⌉ and ⌈2540dpi⌉, and of the output resolutions, ⌈2438.4dpi⌉ is selected in accordance with the operation of a user.

With respect to the halftone dots shapes, there is shown a list of the halftone dots shapes such as ⌈square⌉ ⌈elliptical⌉, ⌈round⌉. Here, ⌈square⌉ is selected.

With respect to the halftone dots line numbers, there is shown a list of the halftone dots line numbers such as ⌈300$^{lpi}$⌉, ⌈250$^{lpi}$⌉, ⌈200$^{lpi}$⌉, ⌈175$^{lpi}$⌉, and ⌈150$^{lpi}$⌉. Here, ⌈175$^{lpi}$⌉ is selected.

With respect to the halftone dots angle sets, there is shown a list of the halftone dots angle sets such as [C15, M45, Y0, K75], [C75, M15, Y0, K45], and [C7.5, M 37.5, Y−7.5, K75], where [C15] denotes that the halftone dots angle of the C-plate is 15°, and [Y−7.5] denotes that the halftone dots angle of the Y-plate is −7.5° Here, [C15, M45, Y0, K75] is selected.

In this manner, the contents of the attribute and the name of the output machine are selected on the screen of the halftone dots pattern attribute set up.

The halftone dots pattern set up section 12 receives the contents of the attributes and the name of the output machine selected by the contents selection section 11, and sets up the contents of the attributes in form of the contents of the attributes of a new halftone dots pattern and sets up the name of the output machine in form of the name of the output machine associated with the new halftone dots pattern in accordance with operations.

The screen of the halftone dots pattern attribute set up shown in FIG. 9 is provided with a set up button b1 and a cancel button b2. When the set up button b1 is depressed, the contents of the attributes set up on the screen of the halftone dots pattern attribute set up are set up in form of the contents of the attributes of a new halftone dots pattern (step S13), and the name of the output machine is set up in form of the name of the output machine associated with the new halftone dots pattern. And a screen of a halftone dots pattern retention shown in FIG. 10 appears. When the cancel button b2 is depressed, the screen of the halftone dots pattern attribute set up is closed.

Figure 10:
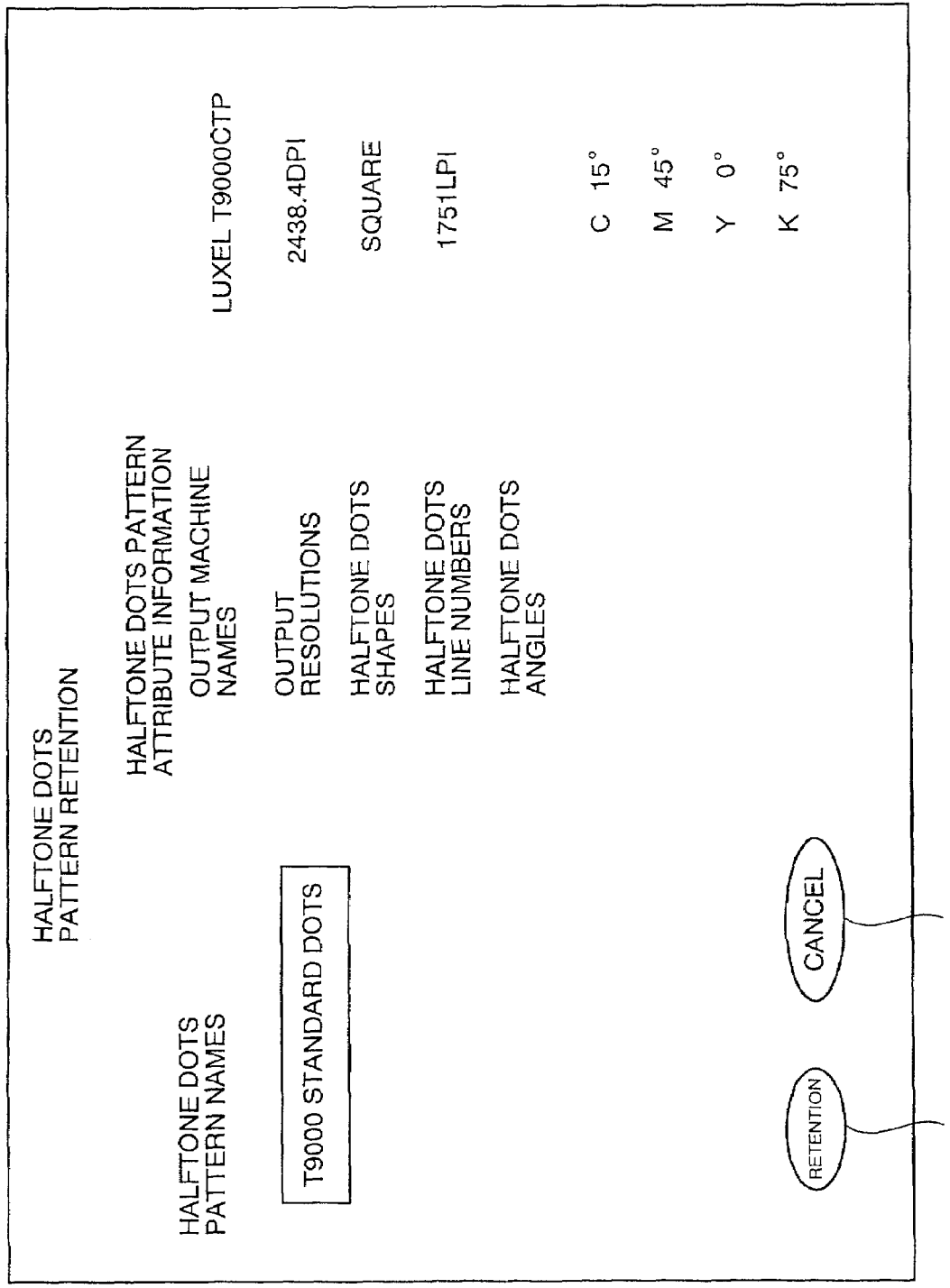
FIG. 10 is view of a screen of a halftone dots pattern retention.

FIG. 10 is view of a screen of a halftone dots pattern retention.

On the screen of a halftone dots pattern retention, there are displayed a name of a halftone dots pattern, and the name of the output machine and the contents of the attributes of the halftone dots pattern, which have been set up on the screen of the halftone dots pattern attribute set up. A user can write the name of the halftone dots pattern on the screen of a halftone dots pattern retention through an operation, wherein the name of the halftone dots pattern is ⌈T9000 standard halftone dots⌋. Further, on the screen of a halftone dots pattern retention, there are provided a retention button c1 and a cancel button c2.

The halftone dots pattern data producing section 13 produces halftone dots pattern data representative of the halftone dots pattern in which the contents of the attributes are set up by the halftone dots pattern set up section 12.

First, when the retention button c1 on the screen of the halftone dots pattern retention is depressed, the halftone dots pattern data producing section 13 produces a threshold matrix according to the halftone dots shape and the halftone dots angle set up by the halftone dots pattern set up section 12. Further, the halftone dots pattern data producing section 13 produces halftone dots pattern data including the threshold matrix thus produced and the contents of the attributes set up by the halftone dots pattern set up section 12 (step S14). The halftone dots pattern data thus produced is stored in the halftone dots pattern data storage section 120 in such a form that a name of a halftone dots pattern specifying the halftone dots pattern represented by the halftone dots pattern data is associated with a name of an output machine (step S15).

In the manner as mentioned above, a user can set up contents of attributes of the halftone dots pattern used in a desired type of output machine by means of simply performing a simple operation of selecting contents of attributes of a halftone dots pattern from a list displayed by the display section 102a, through the proofing halftone dots image data producing apparatus 100. Further, the user can uses the halftone dots pattern data stored in the halftone dots pattern data storage section 120 for the purpose of a halftone dots processing for the multi-tone level image through reading by the halftone dots pattern selecting section 3, when the proof image is produced.

Next, there will be described operations of rotation and reversal for the halftone dots pattern in the halftone dots pattern operating section 5, which are omitted in the last explanation.

Figure 11A:
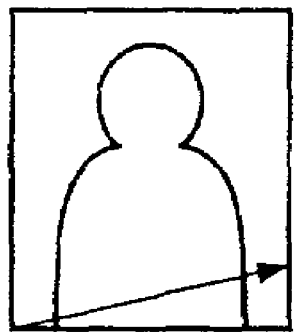
FIGS. 11 (A), (B1), (B2), (C1) and (C2) are views each showing a state of a rotary operation and a reversal operation for a halftone dots pattern.

FIGS. 11(A), (B1), (B2), (C1) and (C2) are views each showing a state of a rotary operation and a reversal operation for a halftone dots pattern.

FIG. 11(A) is a view showing a halftone dots image formed on a printing plate by CTP 500. In FIG. 11(A), there is shown a person, and a direction of an arrow denotes a reference line extending in a direction of a single halftone dots angle of a halftone dots pattern of the halftone dots image. It is assumed that the reference line is directed to the upper right 30° with respect to the horizontal line.

Figure 11:
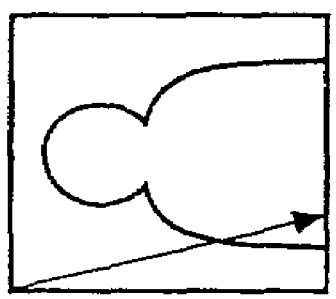
Figure 11:
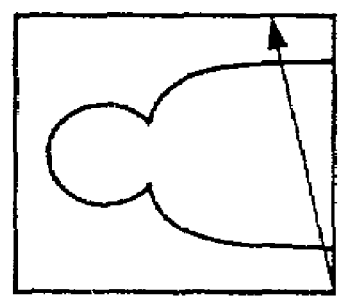
Figure 11:
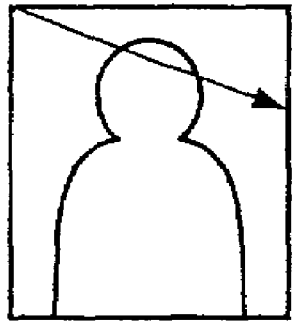
Figure 11:
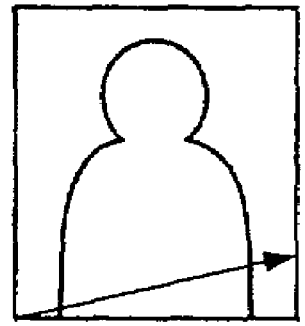

FIG. 11(B1) is a view showing a halftone dots image printed by the printer 200 of the proofer 1000 wherein a halftone dots image formed by the CTP 500 is simulated. Where the printed image is rotated left by 90° (counter-clockwise) as compared with the halftone dots image formed by the CTP 500. Generally, in the proofer, it happens that such a rotation of an image is performed in accordance with a size of a sheet capable of being printed by the printer 200. On the other hand, according to the conventional proofer, even if such a rotation of an image is performed, the halftone dots pattern is not rotated. That is, also with respect to the halftone dots image shown in FIG. 11(B1), the image is rotated left by 90°, but the halftone dots pattern is not rotated and is still directed to the upper right 30° as shown in FIG. 11(B1).

In FIG. 11(B2), the halftone dots pattern is also rotated left by 90° with respect to the image shown in FIG. 11(B1), and the reference line of the halftone dots pattern is directed to the upper left 60° with respect to the horizontal line. Such a rotation of the halftone dots pattern is performed through the halftone dots pattern operating section 5 in accordance with an operation of a user, or a size of an image.

FIG. 11(C1) is also a view, similar to FIG. 11(B1), showing a halftone dots image printed by the printer 200 of the proofer 1000 wherein a halftone dots image formed by the CTP 500 is simulated. In FIG. 11(C1), while the printed image is the same as the halftone dots image formed by the CTP 500 shown in FIG. 11(A), in direction, the reference line of the halftone dots pattern is directed to the lower right 60° different from FIG. 11 (A). Such a difference in the reference line generally occurs owing to the fact that a proofer is different in definition of a halftone dots angle for each type thereof.

In FIG. 11(C2), the halftone dots pattern is reversed up and down with respect to the image shown in FIG. 11(C1), and the reference line of the halftone dots pattern is directed to the upper right 30° with respect to the horizontal line. Such a rotation of the halftone dots pattern is also performed through the halftone dots pattern operating section 5 in accordance with an operation of a user, or a size of an image.

Figure 12:
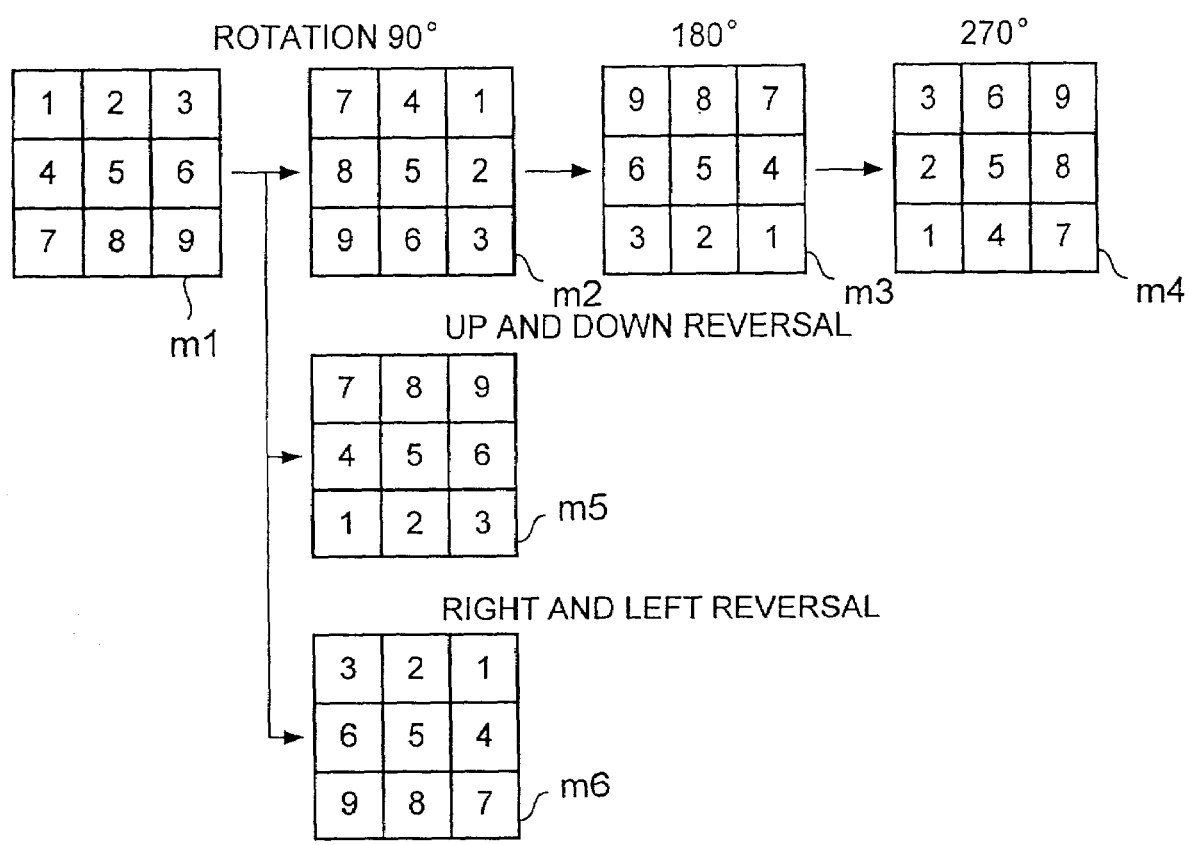
FIG. 12 is a view useful for understanding a conversion of a threshold matrix in a rotary operation and a reversal operation for a halftone dots pattern.

FIG. 12 is a view useful for understanding a conversion of a threshold matrix in a rotary operation and a reversal operation for a halftone dots pattern.

The rotation and the reversal for the halftone dots pattern as shown in FIGS. 11(A) to (C2) are performed in accordance with the threshold matrix shown in FIG. 12.

At the left of FIG. 12, there is a threshold matrix m1 of 3×3 in which the thresholds on the top stage or the first line are 1, 2 and 3 from the left, the thresholds on the middle stage or the second line are 4, 5 and 6 from the left, and the thresholds on the bottom stage or the third line are 7, 8 and 9 from the left. Usually, the threshold matrix has a size larger than 3×3, and it is always not restricted to the square lattice-like matrix. Here, however, for the purpose of simplification, it is assumed that the threshold matrix m1 of 3×3 is included in a certain halftone dots pattern data stored in the halftone dots pattern data storage section 120.

That the halftone dots pattern operating section 5 performs a rotary operation and a reversal operation for a halftone dots pattern representative of the halftone dots pattern data including the threshold matrix m1 specifically means that the halftone dots pattern operating section 5 performs a rotary operation and a reversal operation for the threshold matrix m1 included in the halftone dots pattern data.

In the event that the halftone dots pattern data is called by the proofing halftone dots image data producing section 4 and then transferred to the halftone dots pattern operating section 5, so that the halftone dots pattern operating section 5 performs the rotary operation and the reversal operation for the halftone dots pattern represented by the halftone dots pattern data, the halftone dots pattern operating section 5 performs the rotary operation and the reversal operation for the threshold matrix m1.

As shown in FIG. 12, when the threshold matrix m1 is rotated right by 90°, the threshold matrix m1 is converted into a threshold matrix m2 having thresholds 1, 2 and 3 from the upper right to the lower right, when the threshold matrix m1 is rotated right by 180°, the threshold matrix m1 is converted into a threshold matrix m3 having thresholds 1, 2 and 3 from the lower right to the left, and when the threshold matrix m1 is rotated right by 270°, the threshold matrix m1 is converted into a threshold matrix m4 having thresholds 1, 2 and 3 from the lower left to the upper left.

Further, as shown in FIG. 12, when the threshold matrix m1 is subjected to the up and down reversal, the threshold matrix m1 is converted into a threshold matrix m5 having thresholds 1, 2 and 3 from the lower left to the right, and when the threshold matrix m1 is subjected to the right and left reversal, the threshold matrix m1 is converted into a threshold matrix m6 having thresholds 1, 2 and 3 from the upper right to the left.

Thus, the halftone dots pattern operating section 5 may replace the threshold matrix m1 with any of the threshold matrixes m2, m3, m4, m5 and m6 in accordance with an operation of a user, so that the halftone dots pattern data, in which the threshold matrix is replaced, is transmitted to the proofing halftone dots image data producing section 4. The proofing halftone dots image data producing section 4 produces proofing halftone dots image data having a halftone dots pattern, which is rotated and reversed in accordance with the rotation and the reversal of the threshold matrix, on the basis of the halftone dots pattern data in which the threshold matrix is replaced.

In this manner, subjecting the halftone dots pattern data to the operations of the rotation and the reversal in accordance with the operation of a user makes it possible to control of a direction of the halftone dots pattern in a proof image to a desired direction. Thus, it is possible to solve a difference in direction between the halftone dots pattern used in the printing system 2000 and the halftone dots pattern used in the proofer 1000.

Incidentally, according to the proofing halftone dots image data producing apparatus of the present embodiment, the halftone dots pattern operating section 5 subjects the halftone dots pattern to the rotary and reversal operations. However, in the event that the halftone dots pattern data storage section 120 stores the halftone dots pattern already subjected to such rotary and reversal operations, it is acceptable in an image data producing apparatus of the present invention that the halftone dots pattern operating section 5 is replaced by an operating halftone dots pattern reading section for reading from the halftone dots pattern data storage section 120 a halftone dots pattern subjected to the rotary and reversal operations. According to the image data producing apparatus having such an operating halftone dots pattern reading section, in the event that the halftone dots pattern selecting section 3 selects the rotary and reversal operations, and in the event that the operation determining section 4_1 determines that the rotary operation is performed, the operating halftone dots pattern reading section reads from the halftone dots pattern data storage section 120 a halftone dots pattern specified by information as to a name of the halftone dots pattern and rotary and reversal operations, of data specifying the halftone dots pattern. This halftone dots pattern is transferred to the proofing halftone dots image data producing section 4. The operating halftone dots pattern reading section corresponds to the operating halftone dots pattern obtaining section.

The halftone dots pattern already subjected to the rotary and reversal operations, which is to be stored in the halftone dots pattern data storage section 120, is produced by the halftone dots pattern data producing section 13, for example in such a manner that the halftone dots pattern set up section 12 sets up the halftone dots pattern subjected to the rotary and reversal operations in accordance with the instruction of a user. Alternatively it is acceptable that the halftone dots pattern data producing section 13 automatically produces a plurality of halftone dots patterns subjected to the rotary and reversal operations. In this case, the halftone dots pattern data producing section 13 automatically produces halftone dots patterns subjected to the rotary and reversal operations, without set up by the halftone dots pattern set up section 12. Thus, the halftone dots patterns subjected to the rotary and reversal operations are stored in the halftone dots pattern data storage section 120.

Further, according to the proofing halftone dots image data producing apparatus of the present embodiment, the halftone dots pattern data producing section 13 produces halftone dots pattern data. In the event that the image data producing program 50 already stores various sorts of halftone dots pattern data, and the various sorts of halftone dots pattern data stored in the image data producing program 50 are loaded and stored in the HDD 120, it is acceptable in an image data producing apparatus of the present invention that the halftone dots pattern data producing section 13 is replaced by a set up halftone dots pattern reading section for reading from among the various sorts of halftone dots pattern data stored in the HDD 120 a halftone dots pattern data representative of the halftone dots pattern set up in the halftone dots pattern set up section 12. According to the image data producing apparatus having such a set up halftone dots pattern reading section, when the retention button c1 is depressed on the screen of the halftone dots pattern retention shown in FIG. 9, the set up halftone dots pattern reading section reads from the HDD 120 halftone dots pattern data including contents of attributes of the halftone dots pattern set up by the halftone dots pattern set up section 12 and the threshold matrix associated with the type of the machine set up. The halftone dots pattern data thus read is stored in the halftone dots pattern data storage section 120 in such a form that the halftone dots pattern data is associated with a halftone dots pattern name specifying the halftone dots pattern represented by the halftone dots pattern data and an output machine name. The set up halftone dots pattern reading section corresponds to the set up halftone dots pattern obtaining section.

As mentioned above, according to the present invention, there is provided an image data producing apparatus for producing image data representative of a proof image which reproduces a halftone dots pattern of an image to be printed in a printing system, and an image data producing program storage medium storing an image data producing program which causes a computer system to operate as such an image data producing apparatus when the image data producing program is executed in the computer system.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data producing apparatus for producing proofing halftone dots image data representative of a proof image in which an image obtained by a printing system is simulated, said printing system printing the image in accordance with printing halftone dots image data subjected to halftone dots processing for multi-tone level image data, said image data producing apparatus comprising:

a halftone dots pattern data storage section for storing a plurality of sorts of halftone dots pattern data representative of a plurality of sorts of halftone dots patterns;

an image data obtaining section for obtaining the multi-tone level image data;

a halftone dots pattern selecting section for selecting a single halftone dots pattern according to an operation from among the plurality of sorts of halftone dots patterns represented by the plurality of sorts of halftone dots pattern data stored in said halftone dots pattern data storage section;

a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section; and an image data output section for outputting the proofing halftone dots image data produced by said halftone dots image data producing section, and further comprising an operating halftone dots pattern obtaining section, wherein said halftone dots image data producing section has an operation determining section for determining as to whether a predetermined rotation operation is performed for the halftone dots pattern data representative of the halftone dots pattern selected by said halftone dots pattern selecting section, in accordance with an image size of the multi-tone level image data obtained by said multi-tone level image data obtaining section, and said operating halftone dots pattern obtaining section obtains halftone dots pattern data subjected to the predetermined rotation operation in accordance with a decision by said operation determining section.

2. An image data producing apparatus for producing proofing halftone dots image data representative of a proof image in which an image obtained by a printing system is simulated, said printing system printing the image in accordance with printing halftone dots image data subjected to halftone dots processing for multi-tone level image data, said image data producing apparatus comprising:

a halftone dots pattern data storage section for storing a plurality of sorts of halftone dots pattern data representative of a plurality of sorts of halftone dots patterns;

an image data obtaining section for obtaining the multi-tone level image data;

a halftone dots pattern selecting section for selecting a single halftone dots pattern according to an operation from among the plurality of sorts of halftone dots patterns represented by the plurality of sorts of halftone dots pattern data stored in said halftone dots pattern data storage section;

a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section;

an image data output section for outputting the proofing halftone dots image data produced by said halftone dots image data producing section; and a first set up section for setting up contents of attributes of a halftone dots pattern in accordance with an operation, and a set up halftone dots pattern data obtaining section for obtaining halftone dots pattern data representative of the halftone dots pattern of which contents of attributes are set up, wherein said halftone dots pattern data storage section stores halftone dots pattern data obtained by said set up halftone dots pattern data obtaining section.

3. An image data producing apparatus according to claim 2, further comprising a display section for displaying a list of contents of attributes of a halftone dots pattern, and a contents selecting section for selecting contents of attributes according to an operation from the list of contents of attributes displayed by said display section, wherein said first set up section sets up the contents of attributes selected by said contents selecting section.

4. An image data producing apparatus for producing proofing halftone dots image data representative of a proof image in which an image obtained by a printing system is simulated, said printing system printing the image in accordance with printing halftone dots image data subjected to halftone dots processing for multi-tone level image data, said image data producing apparatus comprising:

a halftone dots pattern data storage section for storing a plurality of sorts of halftone dots pattern data representative of a plurality of sorts of halftone dots patterns;

an image data obtaining section for obtaining the multi-tone level image data;

a halftone dots pattern selecting section for selecting a single halftone dots pattern according to an operation from among the plurality of sorts of halftone dots patterns represented by the plurality of sorts of halftone dots pattern data stored in said halftone dots pattern data storage section;

a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section; and an image data output section for outputting the proofing halftone dots image data produced by said halftone dots image data producing section, wherein the image data producing apparatus operates in parallel with the printing system to provide a proof image simulating the image output by the printing system.

5. The image data producing apparatus according to claim 4, wherein the image data output section comprises at least one of a proofing printer and a display.

6. An image data producing apparatus for producing proofing halftone dots image data representative of a proof image in which an image obtained by a printing system is simulated, said printing system printing the image in accordance with printing halftone dots image data subjected to halftone dots processing for multi-tone level image data, said image data producing apparatus comprising:

a halftone dots pattern data storage section for storing a plurality of sorts of halftone dots pattern data representative of a plurality of sorts of halftone dots patterns;

an image data obtaining section for obtaining the multi-tone level image data;

a halftone dots pattern selecting section for selecting a single halftone dots pattern according to an operation from among the plurality of sorts of halftone dots patterns represented by the plurality of sorts of halftone dots pattern data stored in said halftone dots pattern data storage section;

a halftone dots image data producing section for producing the proofing halftone dots image data by means of subjecting the multi-tone level image data obtained by said image data obtaining section to the halftone dots processing based on the halftone dots pattern data representative of the halftone dots pattern selected by said halftone dots pattern selecting section; and an image data output section for outputting the proofing halftone dots image data produced by said halftone dots image data producing section, wherein said halftone dots image data producing section has an operation determining section for determining as to whether a predetermined rotation operation is performed for the halftone dots pattern data representative of the halftone dots pattern selected by said halftone dots pattern selecting section, in accordance with an image size of the multi-tone level image data obtained by said multi-tone level image data obtaining section.

7. A computer readable medium storing an image data producing program which causes a computer system to operate as an image data producing apparatus for producing proofing halftone dots image data representative of a proof image in which an image obtained by a printing system is simulated, said printing system printing the image in accordance with printing halftone dots image data subjected to halftone dots processing for multi-tone level image data, when the image data producing program is executed in the computer system, said computer readable medium comprising:

a computer readable image data obtaining means for obtaining the multi-tone level image data;

a computer-readable halftone dots pattern selecting means for selecting a single halftone dots pattern according to an operation from among the plurality of sorts of halftone dots patterns represented by a plurality of sorts of halftone dots pattern data;

a computer readable halftone dots image data producing means for producing the proofing halftone dots image data by means of subjecting the multi-tone level image data obtained by said image data obtaining means to the halftone dots processing based on the halftone dots pattern data representative of the halftone dots pattern selected by said halftone dots pattern selecting means; and a computer readable medium image data output means for outputting the proofing halftone dots image data produced by said halftone dots image data producing means;

wherein the proofing halftone image includes a composite proof of multiple colors, wherein said halftone dots image data producing means has an operation determining section for determining as to whether a predetermined rotation operation is performed for the halftone dots pattern data representative of the halftone dots pattern selected by said halftone dots pattern selecting means, in accordance with an image size of the multi-tone level image data obtained by said multi-tone level image data obtaining means.

8. A computer readable medium storing an image data producing program which causes a computer system to operate as an image data producing apparatus for producing proofing halftone dots image data representative of a proof image in which an image obtained by a printing system is simulated, said printing system printing the image in accordance with printing halftone dots image data subjected to halftone dots processing for multi-tone level image data, when the image data producing program is executed in the computer system, said computer readable medium comprising:

a computer readable image data obtaining means for obtaining the multi-tone level image data;

a computer-readable halftone dots pattern selecting means for selecting a single halftone dots pattern according to an operation from among the plurality of sorts of halftone dots patterns represented by a plurality of sorts of halftone dots pattern data;

a computer readable halftone dots image data producing means for producing the proofing halftone dots image data by means of subjecting the multi-tone level image data obtained by said image data obtaining means to the halftone dots processing based on the halftone dots pattern data representative of the halftone dots pattern selected by said halftone dots pattern selecting means; and a computer readable medium image data output means for outputting the proofing halftone dots image data produced by said halftone dots image data producing means, wherein the proofing halftone image includes a composite proof of multiple colors, wherein the medium operates an image data producing apparatus in parallel with the printing system to provide a proof image simulating the image output by the printing system.

* * * * *